US011842302B2

(12) United States Patent
Cao et al.

(10) Patent No.: US 11,842,302 B2
(45) Date of Patent: Dec. 12, 2023

(54) METHOD, DEVICE, CLOUD SERVICE, SYSTEM, AND COMPUTER PROGRAM FOR SMART PARKING A CONNECTED VEHICLE

(71) Applicant: Bayerische Motoren Werke Aktiengesellschaft, Munich (DE)

(72) Inventors: Yang Cao, Chicago, IL (US); Alvin Chin, Chicago, IL (US); Qing Li, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 97 days.

(21) Appl. No.: 16/975,471

(22) PCT Filed: Jun. 18, 2018

(86) PCT No.: PCT/EP2018/066069
§ 371 (c)(1),
(2) Date: Aug. 25, 2020

(87) PCT Pub. No.: WO2019/242832
PCT Pub. Date: Dec. 26, 2019

(65) Prior Publication Data
US 2021/0019671 A1    Jan. 21, 2021

(51) Int. Cl.
*G06Q 10/02* (2012.01)
*G06Q 30/0283* (2023.01)
(Continued)

(52) U.S. Cl.
CPC ......... *G06Q 10/02* (2013.01); *G06Q 30/0283* (2013.01); *G06Q 30/0284* (2013.01);
(Continued)

(58) Field of Classification Search
CPC .... G06Q 10/02; G06Q 30/0284; G08G 1/143; G08G 1/146
See application file for complete search history.

(56) References Cited

U.S. PATENT DOCUMENTS

| | | | |
|---|---|---|---|
| 2012/0095812 A1* | 4/2012 | Stefik | G08G 1/147 705/13 |
| 2014/0249742 A1* | 9/2014 | Krivacic | G08G 1/14 340/932.2 |

(Continued)

OTHER PUBLICATIONS

E. Polycarpou, L. Lambrinos and E. Protopapadakis, "Smart parking solutions for urban areas," 2013 IEEE 14th International Symposium on "A World of Wireless, Mobile and Multimedia Networks" (WoWMoM), Madrid, Spain, 2013, pp. 1-6 (Year: 2013).*

(Continued)

*Primary Examiner* — Jeff Zimmerman
*Assistant Examiner* — Wayne S. Murray
(74) *Attorney, Agent, or Firm* — Crowell & Moring LLP

(57) ABSTRACT

A method for smart parking a connected vehicle is disclosed. The method determines a destination of a user's vehicle based on the user's input or historic travel data of the user. The method receives information on available parking spots in a predefined area near the user's destination based on a parking database. The method receives an input to reserve a desired parking spot among the available parking spots. The method initiates an online check-in of the reserved parking spot in the parking database.

20 Claims, 9 Drawing Sheets

(51) Int. Cl.
*G08G 1/14* (2006.01)
*H04W 4/021* (2018.01)
*H04W 4/02* (2018.01)
*G06Q 50/30* (2012.01)

(52) U.S. Cl.
CPC ............ *G06Q 50/30* (2013.01); *G08G 1/143* (2013.01); *G08G 1/144* (2013.01); *G08G 1/146* (2013.01); *H04W 4/021* (2013.01); *H04W 4/023* (2013.01)

(56) References Cited

U.S. PATENT DOCUMENTS

| | | | |
|---|---|---|---|
| 2016/0180712 A1* | 6/2016 | Rosen | G08G 1/147 |
| | | | 705/5 |
| 2016/0253748 A1* | 9/2016 | Levy | G08G 1/205 |
| | | | 705/13 |
| 2018/0144632 A1 | 5/2018 | Rosen et al. | |
| 2018/0350157 A1* | 12/2018 | Koreishi | G07B 15/02 |
| 2019/0005763 A1* | 1/2019 | Odinak | G07B 15/02 |
| 2019/0065628 A1* | 2/2019 | Holman | G06F 16/29 |
| 2019/0385265 A1* | 12/2019 | Liu | G06Q 50/30 |

OTHER PUBLICATIONS

International Search Report (PCT/ISA/210) issued in PCT Application No. PCT/EP2018/066069 dated Nov. 28, 2018 (three pages).
Written Opinion (PCT/ISA/237) issued in PCT Application No. PCT/EP2018/066069 dated Nov. 28, 2018 (eight pages).

* cited by examiner

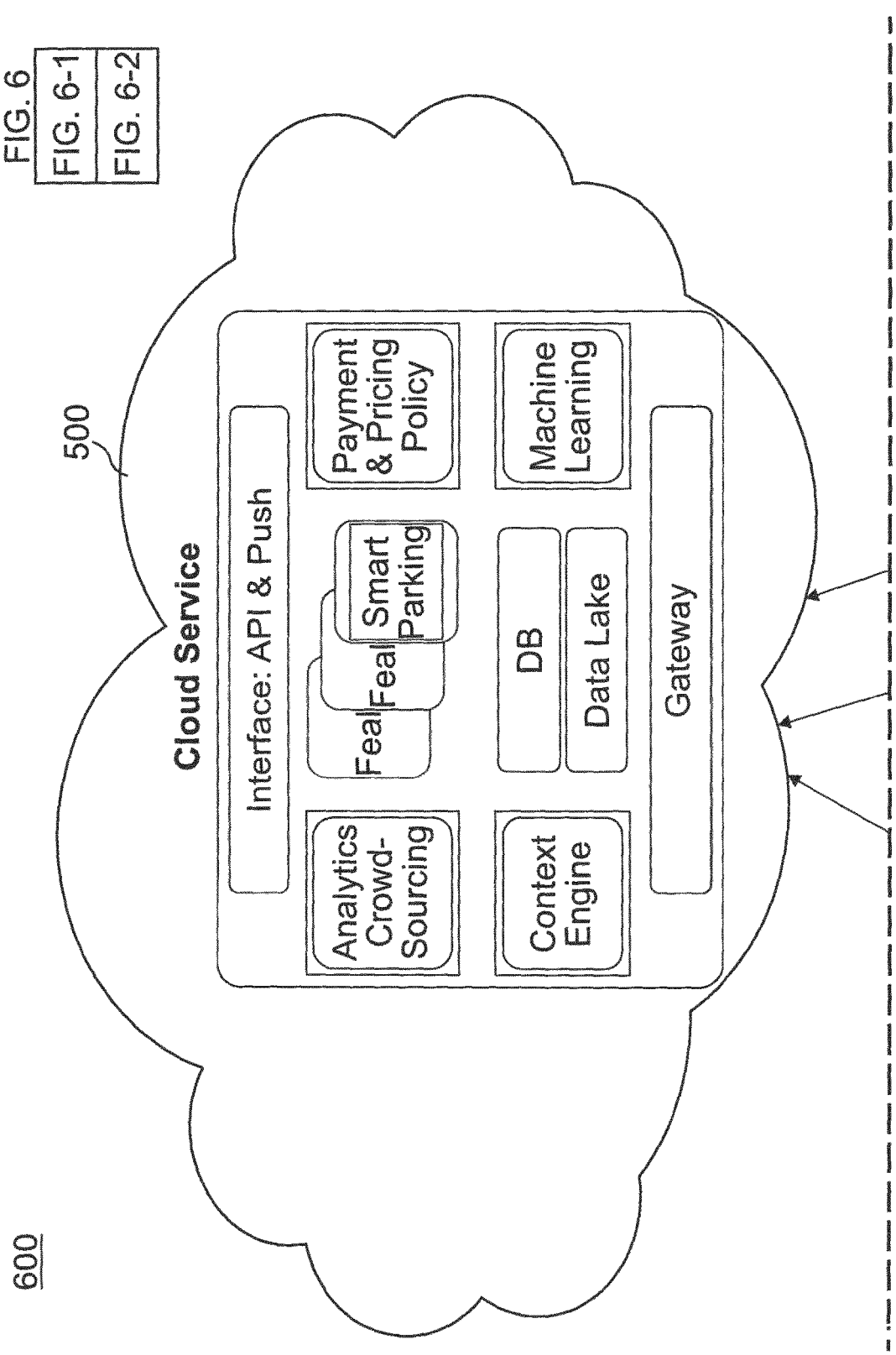

METHOD, DEVICE, CLOUD SERVICE, SYSTEM, AND COMPUTER PROGRAM FOR SMART PARKING A CONNECTED VEHICLE

BACKGROUND AND SUMMARY OF THE INVENTION

The present disclosure relates to smart parking solutions, and in particular, to a method, device, cloud service, system, and computer program for smart parking a connected vehicle.

Parking is becoming a global challenge impacting driving experience due to an increased number of vehicles throughout cities. A recent study has shown that thirty percent of a city's traffic is caused by drivers searching for a parking spot. This time wasted dramatically increases road traffic and unnecessary driving time, as well as impacting overall safety and air pollution.

Some approaches attempting to provide a parking solution rely on hardware sensor technology with IT infrastructure: detecting the parking availability and sharing this information to the cloud. These approaches rely on sensors of various kinds (e.g. wireless RF, cameras) used to monitor the parking spot. The solution is to adhere the sensors or cameras to the parking lot's surface, curb, or wheel-stop to detect and manage the parking event by measuring the sensor signal (e.g. a change in magnetic field caused by a parked vehicle). All of these approaches require a large up-front investment on infrastructure installation, including possible costs for access to the cloud service system. Since the parking business is largely fragmented and owned by different entities ranging from government administrations to small, medium, or large private enterprises and organizations or even personal organizations, this results in a very high barrier to entry.

Other approaches help drivers reserve a spot in a garage, parking lot, or valet service. The user is able to search online for a parking lot that matches their required parking time. These services help the user reserve the parking service (e.g. "a" spot in a parking lot) but they do not reserve an exact parking spot. Thus, once the user arrives at the parking lot, the user must still drive around searching for an empty parking spot within that parking lot. Additionally, these services are not context-aware, requiring a user to initiate the process; they do not take the driving context, payment and user's parking criteria into account.

Thus, there is a need for a context-aware solution for efficiently finding a parking spot for a driver which minimizes the driving time and the distance to the destination, optimizes the parking utilization, and matches a user's parking criteria or learned preferences. Parking service providers may participate in the system without the need for infrastructure or large up-front investments.

This need can be met by methods and apparatuses in accordance with the independent claims. Further preferred embodiments are addressed by the dependent claims.

According to a first aspect, the present disclosure relates to a method for smart parking a connected vehicle. The method comprises determining a destination of a user's vehicle based on the user's input or historic travel data of the user; receiving information on available parking spots in a predefined area around the user's destination based on a parking database; receiving an input to reserve a desired parking spot among the available parking spots; and initiating an online check-in of the desired parking spot in the parking database. Thus, the need to drive around a neighborhood or parking lot looking for a parking spot can be avoided.

In some embodiments, the method may further comprise detecting a change in movement of the user's vehicle, and determining a termination of parking is determined if the change in movement is greater than a predefined threshold. An online check-out of the reserved parking spot may be initiated if a termination of parking is determined. Thus, checking out and paying for parking may be automated.

In some embodiments, the method may further comprise detecting a current location of the user's vehicle and determining a distance from the current location to the destination. The reception of information on available parking spots may be delayed if the distance to the destination is greater than a predefined threshold. Charges for the parking spot can be minimized by waiting until the user is nearby the parking spots before reserving a spot.

In some embodiments, the information on available parking spots may be ranked according to a scoring function weighted according to one or more interests of the user. Suggested parking locations may be optimized for the user based on learned user preferences, increasing the relevance of the suggested available parking spots. The information on available parking spots may comprise dynamic pricing information, wherein the dynamic pricing is determined based on a supply and a demand of available parking spots. The supply and the demand of available parking spots may be determined in real-time. Knowledge of real-time supply and demand may enable dynamic pricing policies for the benefit of the user and the parking provider.

In some embodiments, the desired reserved parking spot may already be in use by another user. The method may comprise reporting a second user if the reserved desired parking spot is in use by the second user. The method may initiate an online check-out of the reserved parking spot and may also initiate an online removal of the in-use parking spot from available parking spots in the parking database. The method may further comprise fining the (second) user if the user parks in a parking spot that was not reserved for the user.

According to a further aspect, the present disclosure provides a mobile device for smart parking. The mobile device comprises a destination processor configured to determine a destination of a user of the mobile device based on the user's input or historic travel data of the user and to transmit the user's destination to a parking processor; a receiver configured to receive information on available parking spots in a predefined area around the user's destination from the parking processor based on a parking database; an interface configured to receive an input to reserve a desired parking spot among the available parking spots; and a check-in processor configured to initiate an online check-in of the desired parking spot. The mobile device may be a smartphone, tablet, laptop, or a device built into a vehicle, such as an infotainment or in-dash device.

In some embodiments, the mobile device may comprise sensor circuitry and a check-out processor. The sensor circuitry may be configured to detect a change in movement of the mobile device. A termination of parking is determined if a change in movement is greater than a predefined threshold. The check-out processor may be configured to initiate an online check-out of the reserved parking spot if a termination of parking is determined.

In some examples, the mobile device may comprise a location detector configured to detect a current location of the mobile device. The destination processor may be further configured to determine a distance from the current location to the destination, and to delay the reception of information on available parking spots if the distance to the user's destination is greater than a predefined threshold.

In some embodiments, the mobile device may comprise a ranking processor configured to rank the information on available parking spots according to a scoring function weighted according to one or more interests of the user.

According to a further aspect, the present disclosure provides a cloud service system for smart parking. The cloud service system comprises a parking processor and a parking database. The parking processor is configured to receive a user's destination and to return information on available parking spots in a predefined area around the user's destination based on the parking database. The parking processor is further configured to update the parking database to check-in to the desired parking spot upon receiving an input to reserve the desired parking spot among the available parking spots.

In some embodiments, the parking processor may be further configured to update the parking database to check-out of the desired parking spot upon notice of termination of parking. In some examples, the parking processor may be further configured to update the parking database based on information received about a parking spot that is in use by someone other than the user for which it was reserved.

According to a further aspect, the present disclosure provides for a system for smart parking. The system for smart parking comprises of the mobile device and the cloud service system described herein.

Some embodiments relate to a non-transitory computer readable medium that, when executed, performs one of the described methods.

Some examples of apparatuses and/or methods will be described in the following by way of example only, and with reference to the accompanying figures.

DETAILED DESCRIPTION OF THE DRAWINGS

Figure 1:
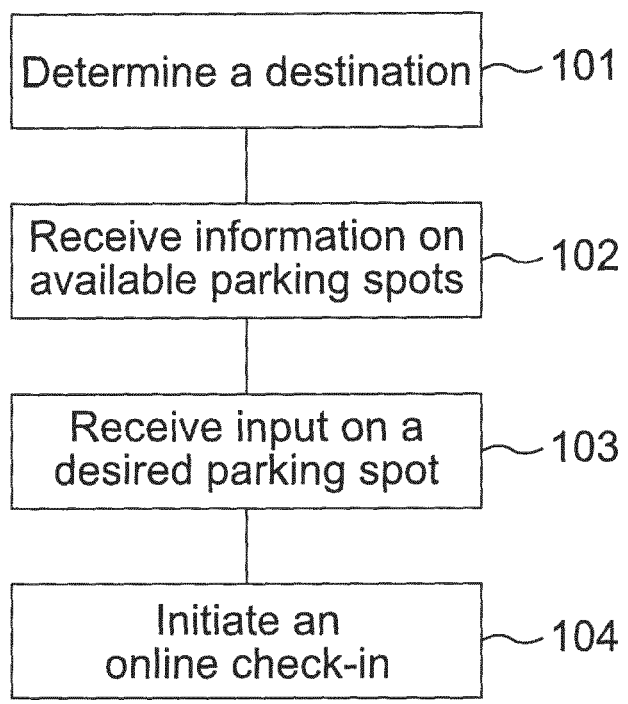
FIG. 1 is a generalized flowchart of a method for smart parking a connected vehicle.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B, as well as A and B, if not explicitly or implicitly defined otherwise. An alternative wording for the same combinations is "at least one of A and B" or "A and/or B". The same applies, mutatis mutandis, for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Smart parking solutions aim to significantly reduce the road traffic, driving time, and time to find parking for drivers, and aim to optimize the business value and parking spot efficiency for parking providers. They are able to offer a smart service leveraging transaction and behavioral data from vehicles and parking spots to provide a smart parking platform. The present disclosure is directed to a smart parking solution leveraging the connected vehicle platform and service. We are quickly approaching a time when all vehicles will be connected to the cloud (e.g. the internet), making it feasible to introduce a digital ecosystem including smart parking.

As used throughout this disclosure, a parking lot refers to a location or structure comprising areas suited for parking vehicles. A parking spot refers to a specific location suited for the parking of a single vehicle. Parking lots comprise parking spots, but parking spots may also be located in other areas that are not parking lots (e.g. street parking). A parking provider refers to an entity that owns or operates a parking lot and/or parking spots that the provider has registered for use in the smart parking system.

FIG. 1 is a generalized flowchart of a method 100 for smart parking a connected vehicle. The method 100 for smart parking a vehicle comprises determining a destination 101 of a user's vehicle based on the user's input or historic travel data of the user; receiving information 102 on available parking spots in a predefined area around the user's destination based on a parking database; receiving an input 103 on a desired parking spot among the available parking spots; and initiating an online check-in 104 of the desired parking spot in the parking database.

The user's vehicle may be any vehicle (e.g. land, sea, or air) for which parking is desired. The connected vehicle may be a vehicle capable of directly communicating with the cloud (e.g. an internet enabled vehicle) or it may be a vehicle that is in communication with a device that is capable of communicating with the cloud (e.g. a vehicle in Bluetooth or Wi-Fi communication with an internet-enabled mobile phone). An internet-enabled device refers to a device that is capable of communicating through the Internet, for example with other servers, vehicles, or a cloud-connected remote database.

The method comprises determining a destination 101 of a user's vehicle based on the user's input or historic travel data of the user. The destination is the location which the user wishes to arrive at, at which point parking for the vehicle will be desired or required. Parking nearby or en route to the destination may minimize the user's travel time and reduce traffic. The destination may be a specific street address (e.g. "123 AnyStreet, Anytown"), a location (e.g. "Anytown Mall," "Downtown," or "Zoo"), or a general area (e.g. "Anytown").

The destination may be obtained from the user's input (e.g. obtained via a user interface such as a touch or talk interface). Additionally, or alternatively, the user's destination may be determined based on historic travel data of the user. The historic travel data may be based on a user profile (e.g. a profile containing a particular user's interests, ratings, and/or prior travel history), previously requested parking destinations, known or predicted destinations (e.g. home or work) or information based on a user's previously known travels or interests (e.g. the user's past history shows that the user prefers the nearest parking spot even if it costs more).

Once a user's destination has been determined, the method comprises receiving information 102 on available parking spots in a predefined area around the user's destination based on a parking database. The information on available parking spots may comprise a list of parking spots which are available for reservation at the time the information is provided. The information on available parking spots may comprise information on candidate parking spot (and/or lot) locations, the distance from the parking spot to the user, the distance from the parking spot to the destination, the parking price (e.g. flat rate, price per unit time, or other variable pricing), parking type (on/off street parking, basement parking, garage and its details like floor), a user's rating (if provided by the user, for example on a previous trip), aggregate users' ratings, the supply and/or demand of the parking spot (or the lot within which it is located), a user's payment related information, or an estimated parking duration. The availability of parking for vehicles with specialized needs (e.g. ports or airstrips, handicap accessible spots, oversize spots such as for recreational vehicles RVs or other special needs) may be limited, and will be dependent, in part, on those services and/or parking spots being supplied by parking providers. The information on available parking spots may be limited to a predefined area around the user's destination. This predefined area may be set by the user or learned based on the user's behavior (e.g. based on the user's historic travel data or the user's profile).

The parking database may comprise a set of data corresponding to all participating parking lots and spots (e.g. those registered for use in the system by participating parking providers). The parking database may manage the list of parking spots and their availability. As users check-in to parking spots, the spot may be removed from availability. Once the user checks-out, the parking spot may be returned to the list of available spots. The user's check-in and check-out times may be used to determine the duration of use for the purposes of fee calculation or to determine real-time supply and demand information. The parking database may also contain additional information pertaining to parking spots (e.g. special features such as handicap accessibility, having a cover, or if the parking spot is in use by an unauthorized user). The parking database may be of any form used to store and/or manage large data sets (e.g. SQL, WL, relational or non-relational databases), including modern data forms which may not traditionally be called a "database" (e.g. block chains). The parking database may be stored in the cloud and/or running on a cloud computing platform which allows the parking database to be accessible as a service (e.g. to multiple users as part of providing a smart parking service). It should be understood that a device communicating with the parking database may be doing so either directly, or indirectly, through another application or device which manages the parking database.

The method comprises receiving an input 103 on a desired parking spot among the available parking spots. The user may provide the input by choosing the desired parking spot directly (e.g. by selecting a parking spot from among a list of parking spots displayed to the user through a user interface) or by allowing the parking spot to be chosen without user input based on learned user behavior and predictions (e.g. based on historical behavior, context, or a user profile). In some cases, a combination of both may be used; the system may provide the information on available parking spots ranked according to a predicted user's desire, and then the system may further select one of these parking spots to present to the user. The user only needs to confirm the selection to complete the parking choice. In some cases, the confirmation step may be omitted or bypassed, which may allow the input to reserve a desired parking spot to be automated.

The method comprises initiating an online check-in 104 of the desired parking spot in the parking database. Once input to reserve a desired parking spot is received (and/or confirmed), the connected vehicle may communicate with the parking database remotely (through the cloud) to initiate a check-in of the desired parking spot. The connected vehicle may communicate with the parking database directly or through secondary means, such as through a mobile or other app. By checking-in, the parking database may be updated to remove the desired parking spot from availability. The check-in time may begin accrual of the user's parking fee (e.g. to be charged for the duration of use of the desired parking spot).

Figure 2:
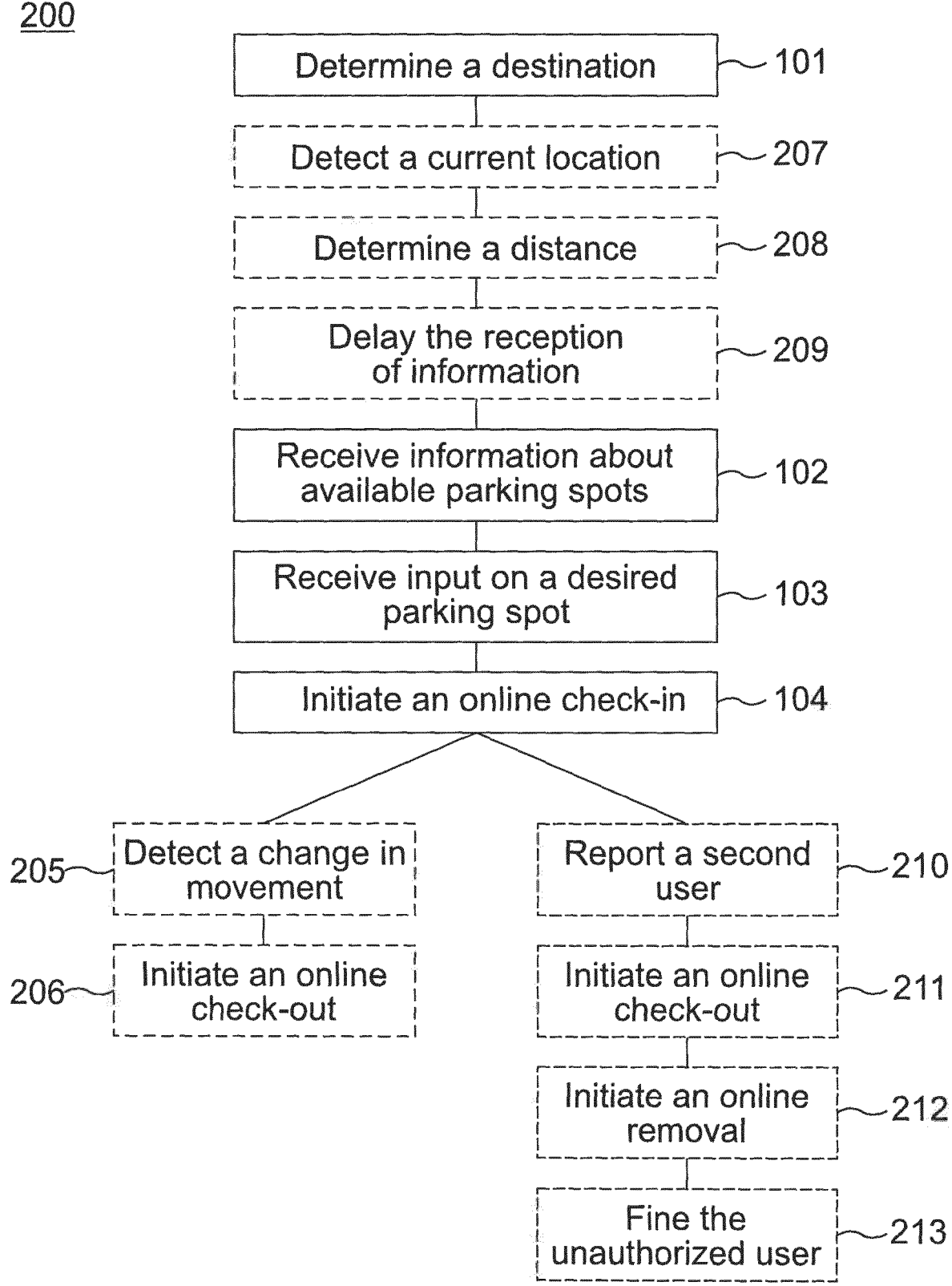
FIG. 2 is a generalized flowchart of the method including additional optional features.

FIG. 2 is a generalized flowchart of a second method 200 for smart parking a connected vehicle including additional optional features not shown in the first method 100. The second method 200 shares features with the first method 100 and like parts are numbered similarly. The description of like parts shall not be repeated here. The second method 200 contains additional optional or alternative features not present in the first method 100.

After a user has parked at the assigned parking spot and completed their activity (e.g. after 104), additionally, or alternatively, the method 200 may comprise detecting a change 205 in movement of the user's vehicle. A change in movement may be detected based on the vehicle's location or from other sensor data available to the vehicle (e.g. tire rotation sensors, speed sensors, accelerometers, or location sensors existing in the connected vehicle or mobile device). A termination of parking may be determined if the change in movement is greater than a predefined threshold. Minor changes in movement, such as slow speeds driven or minor location changes which occur while a user backs or corrects parking, should not trigger a termination of parking. The predefined threshold can be chosen to control the error rate and minimize false positives. In some cases, user confirmation of termination of parking may be requested. The method 200 may comprise initiating 206 an online check-out of the reserved parking spot if a termination of parking is determined. The connected vehicle may communicate (e.g. through the cloud) with the parking database to initiate a check-out of the desired parking spot. By checking-out, the parking database may be updated to return the parking spot to availability. The check-out time may end the accrual of a user's parking fee. In some cases, a termination of parking and/or the check-out process may be manually initiated by the user rather than (or in addition to) being detected based on a change in movement.

Additionally, or alternatively, the method 200 may comprise detecting a current location 207 of the user's vehicle. The vehicle's current location may be determined directly (e.g. via GPS or location detection technology contained within the vehicle). Alternatively, the vehicle's current location may be determined by obtaining a location signal from a mobile device (e.g. the vehicle's current location may be determined by obtaining the location of a GPS-enabled mobile phone located within the vehicle). The method 200 may comprise determining a distance 208 from the current location to the destination and delaying 209 the reception of information on available parking spots if the distance to the destination is greater than a predefined threshold. Thus, if the user's vehicle is far enough away from the destination, the reception of information 102 on available parking spots may be delayed. This prevents the user from checking-in (and being charged for) a parking spot while the user still has a long travel time to complete before arriving at the said parking spot. The predefined threshold may be chosen based on user preferences and/or known transit times of a given area. The predefined threshold, for example, may be 2 kilometers. If a user is greater than 2 kilometers away from the destination, the reception of available parking spots is delayed and no parking spots are received. Once a user is within 2 kilometers to the destination, the delay is terminated, and a list of available parking spots is then received. If the user now chooses a desired parking spot and checks-in, the user will spend only minimal travel time before arriving at the destination.

The information on available parking spots may be ranked according to a scoring function weighted according to one or more interests of the user. A scoring function may be modeled which weighs various interests of a user according to that user's desires (e.g. placing a greater weight on price for user 1 but a greater weight on distance to destination for user 2). The weights of a given user's interests may be obtained directly from the user (e.g. via a user input) or through analysis of past behavior (e.g. machine learning and/or analysis of user history). The scoring function may rank the available parking spots based on known information and weighted according to the interests of the user. The scoring function is discussed in more detail in connection with FIG. 7.

The information on available parking spots may comprise dynamic pricing information. The dynamic pricing information may be determined based on a supply and a demand of available parking spots. The supply and the demand of available parking spots may be determined in real-time. Since all vehicles requesting parking communicate with the parking database, the available supply and demand of all participating parking lots at a given time can be known. A dynamic pricing model can be applied to adjust prices in real-time. The dynamic pricing model is discussed in more detail in connection with FIG. 8.

Additionally, or alternatively, the method 200 may comprise reporting 210 a second user if the reserved desired parking spot is in use by the second user. Once a user checks-in to a parking spot, that spot is reserved for the user. If the user is unable to park at that parking spot because a second user is already parked in that spot, then the user may report the second user for unauthorized parking. A user report may comprise information sufficient to establish that an unauthorized user is currently in the assigned parking spot. For example, a user may report the unauthorized second user by taking a picture of the unauthorized car (e.g. showing the car's license plate number) in the assigned parking spot. The picture and/or the report may be submitted through an appropriate app or software in communications with the parking database and/or cloud service system. The method 200 may initiate 211 an online check-out of the reserved parking spot and initiate 212 an online removal of the in-use parking spot from available parking spots in the parking database. If a user reports that the user is unable to park in the reserved parking spot due to a second user (or other encumbrance preventing usage of the parking spot), it should be recognized that the user could not (and never did) use the parking spot. The parking database may be updated accordingly to remove the user from the parking spot. The user can then initiate a new reservation. However, instead of returning the parking spot to availability (as in 206), the parking spot is marked as being unavailable due to an unauthorized vehicle.

Parking providers may need to periodically assess their lots, to report any parking spots containing unauthorized vehicles, and to report if and when said vehicles have been removed (and/or to have them towed or otherwise removed if necessary). Once a parking provider reports that an unauthorized vehicle has been removed from the parking spot that parking spot can then be returned to availability for other users. It is the responsibility of the user to ensure that they are parked in the parking spot reserved for the user. The method 200 may comprise fining 213 the user if the user parks in a parking spot that was not reserved for the user. A user parking in a spot for which they were not authorized may be subject to fines and/or additional costs involved with the removal of their vehicle from the parking spot. A user may be fined for unauthorized parking irrespective of how the user was reported (e.g. by another user or by the parking provider). Fines may be sufficiently large to discourage any attempts at cheating the system (e.g. by spoofing the location of the connected vehicle to terminate parking without actually leaving). In some cases, if the unauthorized user is not known to the system, the user may be determined based on the license plate number of the unauthorized vehicle reported.

Figure 3:
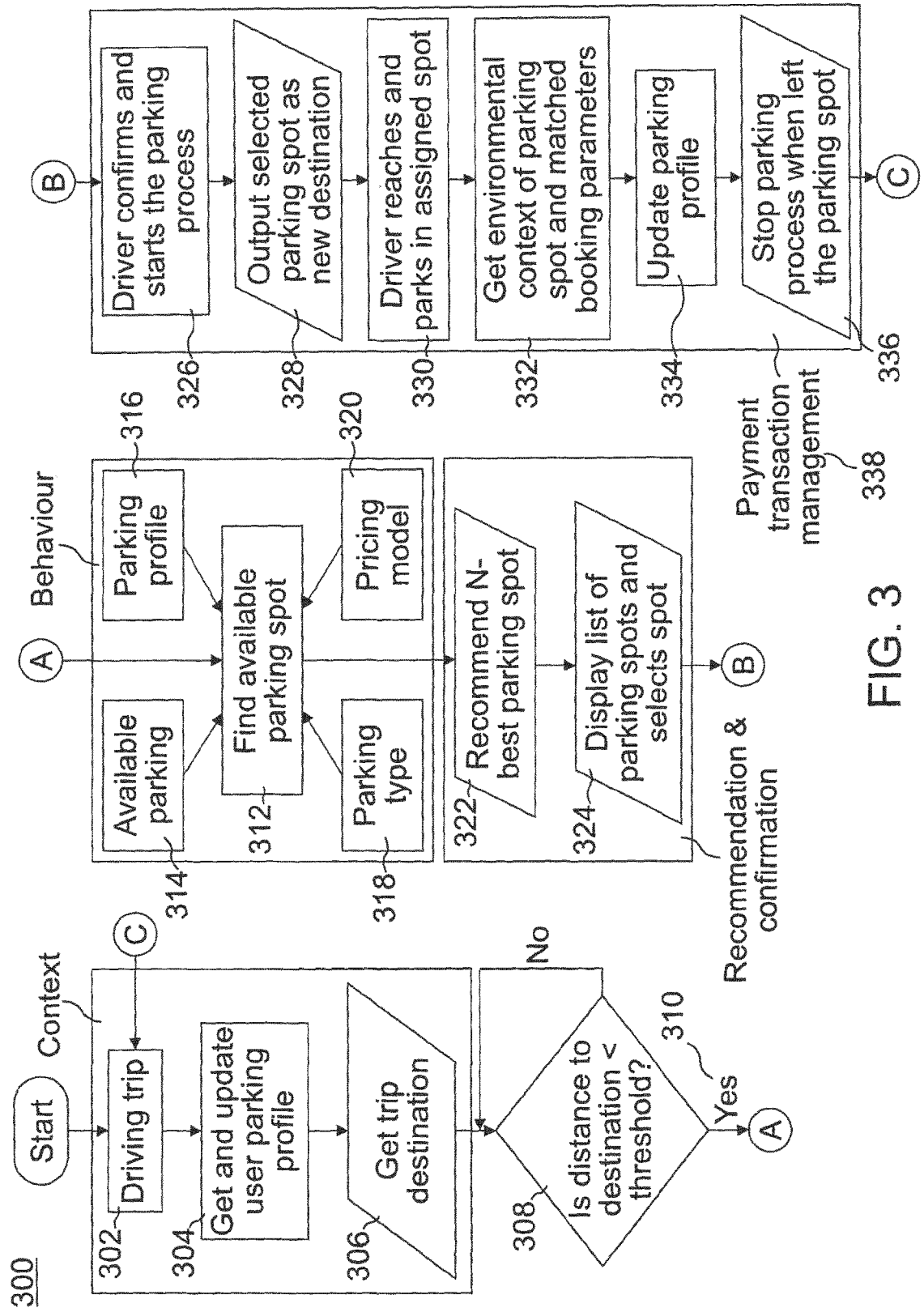
FIG. 3 is a high-level flowchart of an embodiment of the method for smart parking a connected vehicle.

FIG. 3 shows a high-level flowchart of an embodiment of a method 300 for smart parking a connected vehicle. Once a user is driving 302 (e.g. as determined by a context-aware monitor), the user's parking profile 316 may be obtained and/or updated 304. The parking profile 316 may be retrieved from local memory, retrieved from the cloud, or based on information obtained from the user (e.g. via a user input). The parking profile 316 may contain the user's historic travel data or other preferences. Based on the user's input or historic travel data of the user, the user's trip destination 306 may be determined.

The current location of the user's vehicle may be monitored, for example by a context-aware monitor. A context-aware monitor may track the various data feeds and sensors accessible to the connected vehicle, monitoring for changes to determine contextual behavior. The context-aware monitor could determine a distance 308 from the current location to the destination. If the distance to the destination is greater than a predefined threshold 310, then the context-aware monitor could determine that the user is too far away from the parking spot at that time and the reception of information on available parking spots may be delayed. The reception of information may be delayed by requesting the information at a later time or requesting that the information be sent at a later time (e.g. requesting or receiving the information at a future time when the context-aware monitor believes the user to be within the threshold range of the destination) or by simply not initiating any check-in and requesting the information again later.

Once information on available parking spots 312 is requested, multiple sources of information may be used in order to recommend 322 the N-best available parking spots. The information on available parking spots may be within a predefined area around the user's destination based on the parking database containing several sources of information related to the parking spots. The availability of parking spots 314 may be one source of information, as a parking spot should be available (e.g. not parking in, encumbered, or otherwise unable to be parked in) before it can be offered to a user for parking. A user's parking profile 316 may be another source of information, containing the user's parking preferences, historical data, and/or destination. Other details about the parking spot's type 318, such as information related to special features (e.g. oversized spots), covered parking, handicap accessible, long-term, security patrolled, and similar parking spot related information provided by parking providers may be considered. A pricing model 320 may be applied to the available parking spots, enabling pricing based on real-time supply and demand of the spots in a given area. The pricing model 320 is discussed in more detail in connection with FIG. 8.

Based on the information on available parking spots 312, the N-best parking spots may be recommended 322. The list of recommended parking spots may be displayed 324 to the user via a user interface (e.g. a touch or talk interface) and the user may select a spot by providing an input to reserve a desired parking spot among the available parking spots. In some cases, the user may directly select the desired spot from the list of recommended parking spots. In other cases, the context-aware monitor may determine the preferred choice, for example based on past user behavior. If a user chooses the same parking spot every day for a week, the system can say with increasing confidence that the user will again prefer that particular spot.

Additional information related to a chosen parking spot may be provided to the user. If the parking spot meets the user's demands, the user may confirm 326 (initiating an online check-in of the desired parking spot in the parking database) and start the parking process. A parking spot that has been checked-in is considered in-use and will no longer be available to other users. In some cases, a user may change their mind (e.g. the user's destination changes or the user decides on different parking criteria). The user may be given a predetermined amount of time to cancel the check-in without incurring any fees or penalties. For example, a user may be given 5 minutes from check-in to cancel (e.g. check-out) of the parking spot without being charged for the duration of use.

The user can now drive to the designated parking spot first to park the car before heading to the destination. Thus, the selected parking spot is output 328 as the new destination for the user (e.g. in the user's navigation). The user reaches and parks 330 at the assigned spot as desired and continues about their business. Environmental context parameters 332 of the parking spot used may be obtained (e.g. the location of the actual parked vehicle) and these may be matched to booking parameters (e.g. the location of the assigned parking spot as recorded in the parking database). If a user is parked outside of a threshold of the assigned parking spot, the user may be provided a warning alerting the user to such a grievance. If a user disregards such warnings or otherwise decides to park in an unauthorized spot, the user may be subject to fines or additional costs. The user's parking profile 334 may be updated with the user's choice and usage of the parking spot.

Once a user stops the parking process 336 and leaves the parking spot (e.g. by driving away), the context-aware monitor may be able to detect a change in vehicle state (e.g. from parked state to driving state, for example based on sensors modernly equipped in most cars, such as tire rotation sensors or location detection). In some cases, a user may initiate or confirm the termination of parking; however, such an interaction is not necessary. The termination of parking may be determined by detecting a change in movement of the user's vehicle greater than a predefined threshold. If it is determined that the user has stopped the parking process 336, an online check-out of the reserved parking spot may be initiated, returning the parking spot to availability. Once the parking has terminated, it may be possible to automate payment transaction management 338 as well. The fee for the usage of the parking spot may be determined at the time of check-out, and since the vehicle is connected to the cloud, payment for such a fee may be enabled by internet-based or other wireless based payment processing.

User input may be requested at several points. However, it should be appreciated that user input is not necessary to effectuate smart parking, although user input may be necessary at least once for other purposes, such as for effectuating a binding contract (e.g. accepting the parking spot at the given price and conditions). These other considerations aside, it would be possible for the user to simply trust the recommendation system, automatically choosing the best recommended parking spot without input from the user.

The system holistically integrates the following information together:

Context—user driving location updates. With this context data, the system is able to identify if the user is approaching the destination for possible parking services or completing the parking service when leaving the location as detected by vehicle data in real time.

Behavior—user behavior learned from user and transactional data. With learned behavior, the system is able to know if the user needs parking when approaching the destination, and what parking preferences the user may have from previous parking times or user input.

Recommendation and confirmation. Leveraging the parking event detection from context and behavior modules as mentioned above, the system is able to recommend preferred parking spots, and users can confirm the selection.

Payment transaction management. Upon a user's confirmation, the system starts charging the user for the parking spot. The charging will be ended when the system identifies that the vehicle is moving from vehicle data like location, move, and engine start. The charging can be terminated either automatically or through a user's confirmation specified in the settings.

Figure 4:
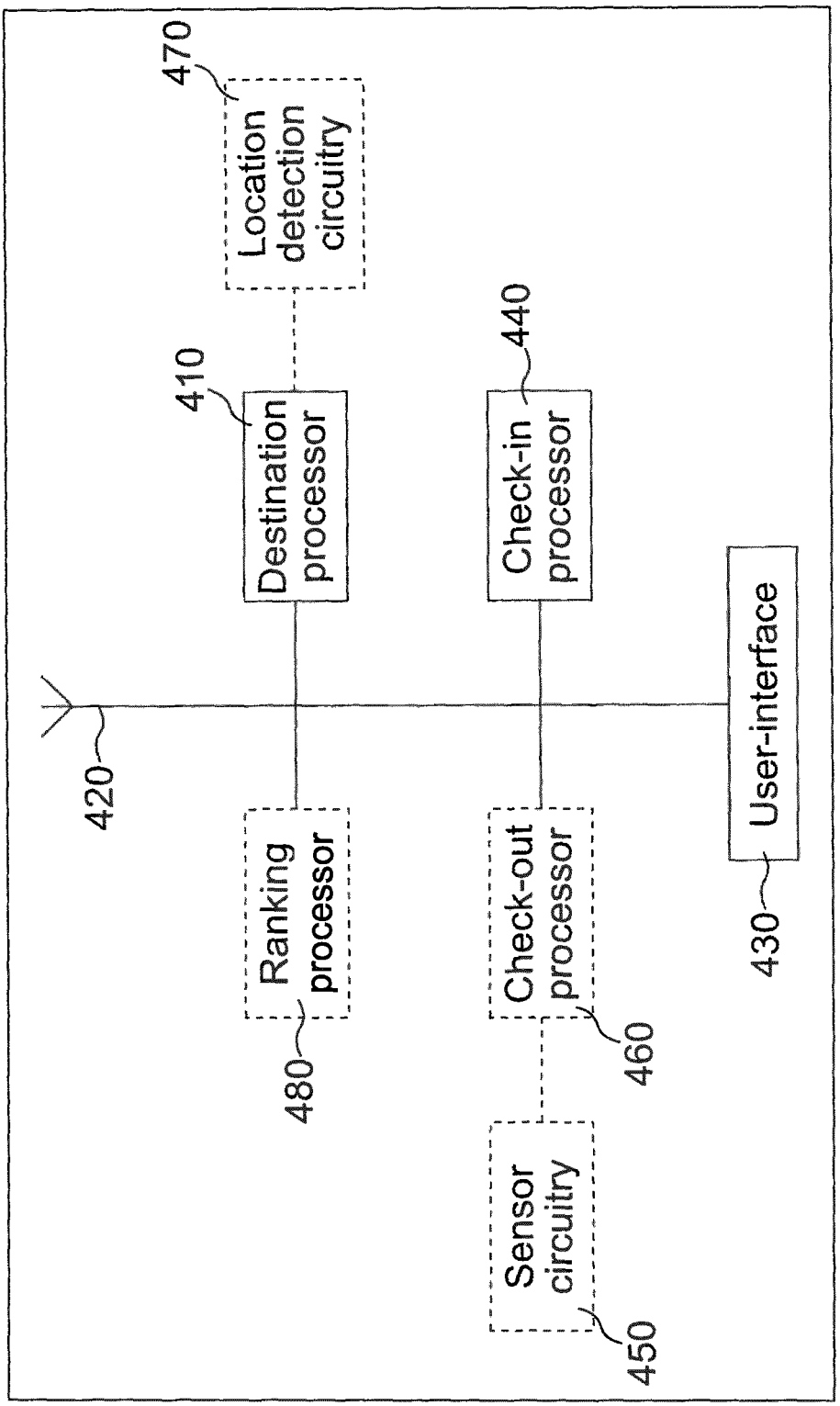
FIG. 4 is a schematic diagram of a mobile device for smart parking.

FIG. 4 shows a schematic diagram of a mobile device 400 for smart parking. The mobile device 400 comprises a destination processor 410, a receiver 420, an interface 430, and a check-in processor 440. Optionally, the mobile device 400 may further comprise sensor circuitry 450, a check-out processor 460, a location detector 470, and/or a ranking processor 480. The mobile device 400 may be a vehicle, a component of a vehicle, or a separate mobile device being moved with or contained within the vehicle, such as a mobile phone.

The destination processor 410 is configured to determine a destination of a user of the mobile device based on the user's input or historic travel data of the user and to transmit the user's destination to a parking processor. The parking processor may be located in a remote cloud-enabled device configured to communicate, or in communication with, the parking database (see FIG. 5). The parking processor may be configured to obtain information on available parking spots from the parking database and to rank recommended spots based on known or predicted user preferences. In some cases, the mobile device 400 may receive a list of all available spots and perform the ranking itself (e.g. via the destination processor 410 or ranking processor 480). In other cases, the ranking may be performed server-side (e.g. in the cloud) and the pre-ranked list may be received by the mobile device 400 (or some combination of both).

The receiver 420 is configured to receive information on available parking spots in a predefined area around the user's destination from the parking processor based on a parking database. Receiver 420 may be a transceiver, also configured to transmit the destination as determined by the destination processor 410 to the parking processor. In general, receiver 420 may be configured to communicate with the parking database or the parking processor (by means of a transceiver in communication with the parking processor). Receiver 420 is configured to be cloud-enabled, capable of communicating with servers connected to the Internet.

The interface 430 is configured to receive an input to reserve a desired parking spot among the available parking spots. The interface may be a visual interface with a keyboard (e.g. a monitor and keys), a touch interface (e.g. a touchscreen), or an audio interface (e.g. a spoken assistant). The interface 430 may be configured to output the list of available or recommended parking spots to the user and to receive from the user an input to reserve the desired parking spot. The interface 430 may be further configured to provide the user other information related to the parking spots or to output navigation-related data (e.g. to display a map or audibly direct the user to the assigned parking spot). In some cases, the interface 430 may also be used to initiate and/or to submit a report of an unauthorized user or unusable parking spot.

The check-in processor 440 is configured to initiate an online check-in of the desired parking spot. Once a desired parking spot has been confirmed, the check-in processor 440 communicates with the parking processor (e.g. via receiver 420) to check-in to the parking spot. A successful check-in assigns the chosen parking spot to the authorized user.

Optionally, the mobile device 400 may further comprise sensor circuitry 450. Sensor circuitry 450 may be configured to detect a change in movement of the mobile device 400. Sensor circuitry 450 may be circuitry capable of detecting a change in movement by detecting a change in location, speed, or other factors from which a movement of the mobile device may be determined. For example, accelerometers detecting an acceleration of the mobile device 400 or a GPS detecting a change in location over time. If the mobile device 400 is a vehicle, tire rotation sensors may enable sensor circuitry to detect a change in movement. A termination of parking may be determined if a change in movement is greater than a predefined threshold. A termination of parking means that the user has completed the parking event and has left the parking spot. Once a termination of parking is determined, appropriate check-out and/or payment procedures may be desired.

Optionally, the mobile device 400 may further comprise check-out processor 460. Check-out processor 460 may be configured to initiate an online check-out of the reserved parking spot if a termination of parking is determined. A context-aware monitor may monitor the status of parking. If a user parks the connected vehicle in the desired parking spot for some time, the vehicles sensors will read that the vehicle is stopped and in that given location. Once the user returns to the vehicle and drives off, the context-aware monitor can use this information to determine that the user's parking has terminated. Thus, once the mobile device 400 has determined that a termination of parking has occurred, the check-out processor 460 may communicate with the parking processor or the parking database (e.g. parking processor 520 of cloud service system 500, FIG. 5) to initiate an online check-out of the reserved parking space (e.g. to end charging the user for the parking spot and to return it to availability). The check-out processor 460 may be further configured to process a payment or to manage payment transactions regarding the usage of the parking spot.

Optionally, the mobile device 400 may further comprise a location detector 470. Location detector 470 may be configured to detect a current location of the mobile device. The location of the device may be used for several different reasons, such as to determine a termination of parking, to confirm that a user has parked in the assigned parking spot, or to minimize unnecessary time spent checked-in to a parking spot. The destination processor 410 may be further configured to determine a distance from the current location to the destination, and to delay the reception of information on available parking spots if the distance to the user's destination is greater than a predefined threshold. Thus, the destination processor 410 may delay the request and/or reception of available parking spots until the user is reasonable close enough to the destination to warrant checking-in to a parking spot. If the user checks-in to a parking spot while far away, the parking spot will remain empty for a long time while the user travels to it. This results in what will appear to be an empty parking lot (although the parking spots will not be available) and the user will end up paying for time used in a parking spot they have not yet arrived at.

Optionally, the mobile device 400 may further comprise ranking processor 480. Ranking processor 480 may be configured to rank the information on available parking spots according to a scoring function weighted according to one or more interests of the user. The ranking processor 480 may be configured to execute one or more ranking algorithms. The ranking algorithms may be one or more scoring functions to rank the information on available parking spots. The ranking processor 480 may retrieve information on the one or more interests of the user from memory (e.g. stored in a memory within the mobile device 400), from another connected device or system (e.g. another device within a connected vehicle) or from the parking processor or other source in the cloud (e.g. an online profile database). In some cases, the ranking algorithms and/or scoring functions may be implemented in other components of the system (e.g. client-side in the destination processor 410 or server-side in the cloud); for example, in some cases, the ranking processor 480 may be co-located or integrated into the destination processor 410.

Figure 5:
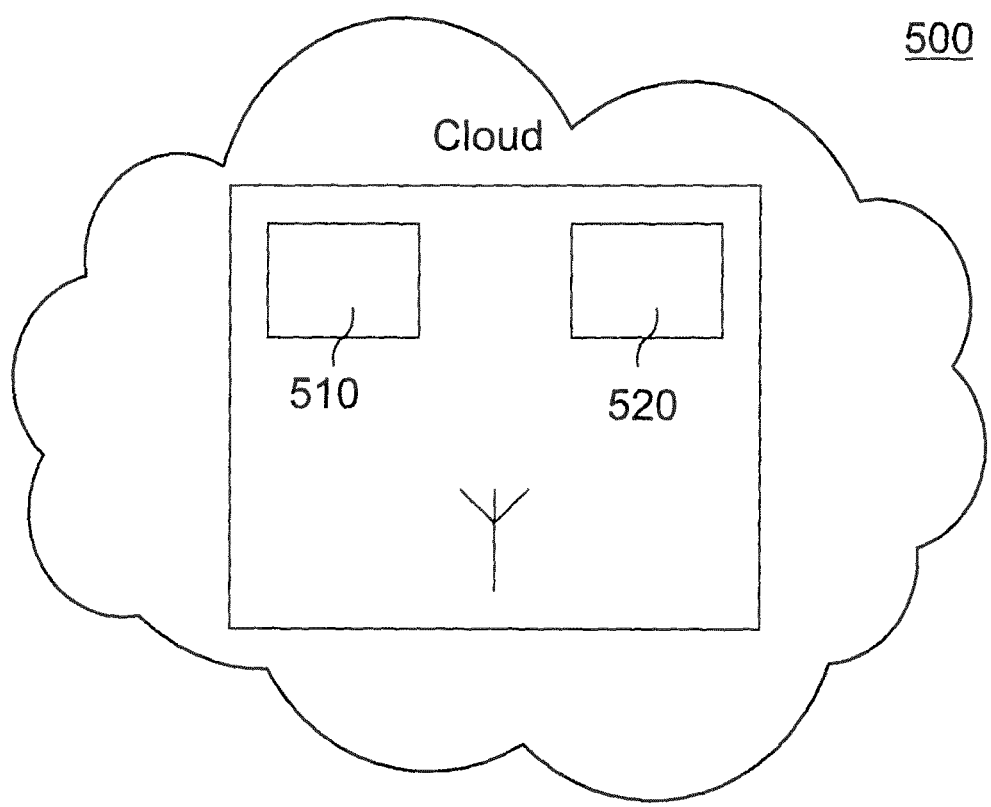
FIG. 5 is a schematic diagram of a cloud service system for smart parking.

FIG. 5 shows a schematic diagram of a cloud service system 500 for smart parking a connected vehicle. The cloud service system is configured to communicate with one or more connected vehicles through the cloud, such as for receiving check-in and check-out requests. The cloud service system 500 comprises a parking database 510 and a parking processor 520.

The parking database 510 may comprise a set of data corresponding to all participating parking lots and spots (e.g. those registered by participating parking providers). The parking database 510 may manage the list of parking spots and their availability. As users check-in to parking spots, the spot is removed from availability (e.g. removed from the list of available parking spots). Once the user checks-out, the parking spot is returned to the list of available spots. The parking database 510 may also contain additional information pertaining to parking spots (e.g. special features such as handicap accessibility, having a cover, or if the parking spot is in use by an unauthorized user). The parking database 510 may know the availability and demand of parking spots at any given time.

The parking processor 520 may be configured to receive and process parking information requests (e.g. availability of parking, check-in/out, or reporting an unauthorized user) from connected vehicles and/or mobile devices through the cloud (e.g. from the destination processor 410 of a mobile device 400). The parking processor 520 may be configured to communicate or process these requests with the parking database 510, checking vehicles in and out accordingly (and, in some cases, marking spots as unavailable or issuing notifications for fines). The parking processor 520, in cooperation with the parking database 510, may manage the real-time availability of parking spots.

The parking processor 520 may be configured to receive a user's destination (e.g. through the cloud and/or from a mobile device) and to return information on available parking spots in a predefined area around the user's destination based on the parking database 510. The parking database 510 contains information on all available parking spots at the time the request for information is made. These available spots may be filtered and ranked according to a user's criteria. In some cases, the parking processor may receive some criteria and filter or rank the available spots before returning the information. In other cases, the parking processor may return information on all available parking spots within a threshold around the destination (e.g. a maximum number of spots found or a maximum distance from the destination) and allow the user's device to perform the filtration and ranking client-side.

The parking processor 520 may be configured to update the parking database 510 to check-in to the desired parking spot upon receiving an to reserve the desired parking spot among the available parking spots. Once the parking processor 520 receives confirmation of a request for parking (e.g. a check-in request, for example from check-in processor 440 of a mobile device 400), the parking processor 520 may update the parking database 510 to remove the requested parking spot from availability. The parking processor 520 may update the parking database 510 to note the user, time, or other details of the parking spot being checked-in.

Additionally, or optionally, the parking processor 520 may be configured to update the parking database 510 to check-out of the desired parking spot upon notice of termination of parking. Once the parking processor receives confirmation of a termination of parking (e.g. a check-out request, for example from check-out processor 460 of mobile device 400), the parking processor 520 may update the parking database 510 to return the requested (assigned) parking spot to availability. The parking processor 520 may update the parking database 510 to note anything relevant regarding check-out (e.g. if the check-out was the result of an unauthorized user in the spot).

Additionally, or optionally, the parking processor 520 may be further configured to update the parking database 510 based on information received about a parking spot that is in use by someone other than the user for which it was reserved. In some cases, another user or other encumbrance may prevent a user from parking in the assigned spot. In these cases, the user may report such a situation. Upon receiving information that a given parking spot is unusable, the parking processor 520 may update the parking database 510 to remove that parking spot from availability. The parking processor 520 may update the parking database 510 to list the parking spot as containing an unauthorized vehicle or user, or for being in accessible or unusable (as the case may be). This information may be used by parking providers to remove unauthorized users or encumbrances from their property to ensure all spaces that a provider has registered with the system are active and in use.

Figure 6:
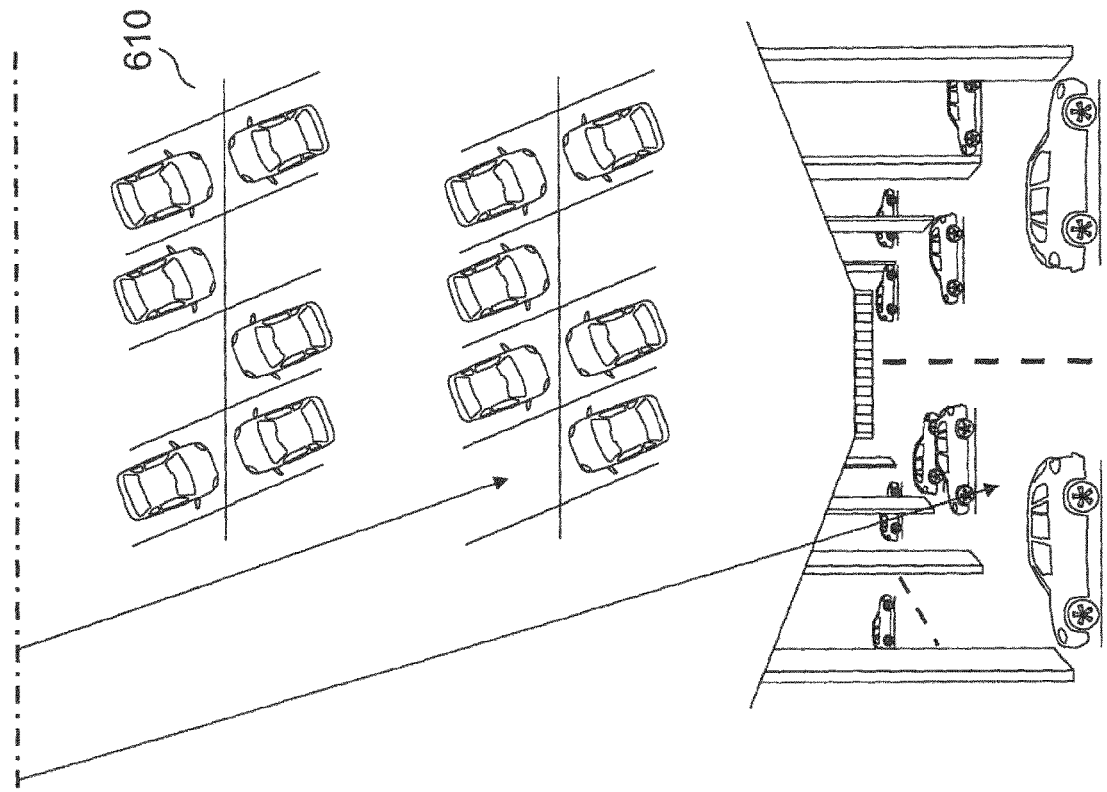
FIG. 6 is an overview of a smart parking system.
Figure 2:
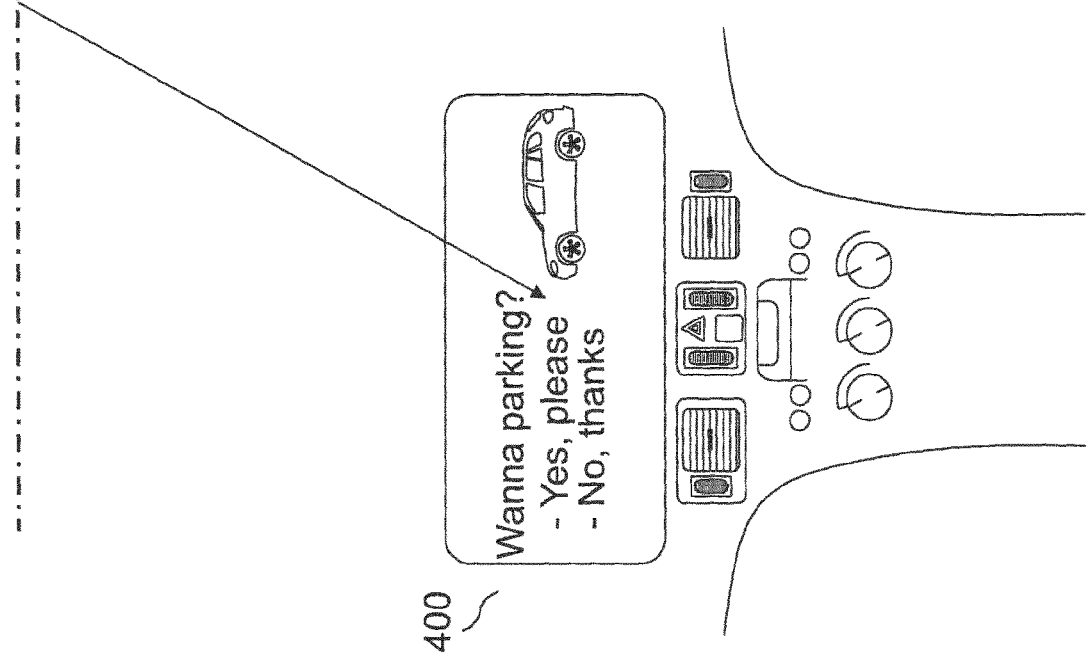

FIG. 6 shows an overview of a smart parking system 600. The smart parking system 600 comprises the mobile device 400 and the cloud service system 500.

The mobile device 400 determines a user's destination. Once the distance to destination is sufficiently small (e.g. less than a predefined threshold), the mobile device 400 may transmit (e.g. through the cloud) the destination to the cloud service system 500. The mobile device 400 may also transmit to the cloud service system 500 additional preferences and/or search criteria related to the desired parking spot (e.g. distance to destination, user preferences such as covered parking, etc.).

The cloud service system 500 returns a list of available parking spots within a threshold of the destination. The cloud service system 500 may further filter and/or rank the list of available parking spots based on additional criteria given to it by the mobile device 400 before returning the list of available parking spots to the mobile device 400. In some cases, the cloud service system 500 may return the list of all available parking spots to the mobile device 400, allowing the mobile device to perform the ranking and/or filtration of the said list.

Once the mobile device 400 receives the information on available parking spots, this information is presented to the user. The user may then input a decision into the mobile device 400 by confirming the desired parking spot. In some cases, the decision on a desired parking spot may be made automatically based on machine learning or other criteria provided by the user.

The information on the confirmed desired parking spot is transmitted to the cloud service system 500 by the mobile device 400 and a request to check-in the user to the desired parking spot is made. The cloud service system 500 confirms that a check-in to the requested parking spot is still available, and if so, checks the user into the spot accordingly. In some cases, a check-in may require some form of payment (or deposit) from the user. For example, the user may provide a credit card. A "hold" charge may be placed on the credit card once a parking spot is checked in to, and a final amount may be billed to the card once the parking spot is checked out of and a final fee is known (similar to a hotel). By placing a hold or deposit charge, the user is encouraged to use the system as intended.

In some cases, a user may check-in to a parking spot but never arrive nor check-out. In these cases, the user may be billed for the time checked-in (e.g. the time the parking spot was considered in use and unavailable to others, even if the user was not actually parked there). Additionally, or alternatively, a user may be fined or penalized, discouraging such behavior. If a user has not arrived for a long time (e.g. 15 minutes or 1 hour) after checking-in, it may be impractical to charge the user for the use of the parking spot indefinitely while the parking spot remains empty. An empty but unavailable lot may frustrate other users and lead to inefficient use of the parking provider's space. Thus, the user's check-in may expire if the user does not arrive to the assigned parking within a predefined threshold of time (e.g. 5, 15, 30, or 60 minutes) after checking-in.

Once the context-aware monitor of the mobile device 400 determines a termination of parking has occurred, this termination of parking is transmitted to the cloud service system 500. The cloud service system 500 then checks the user out of the spot. Payment processing may be managed through the cloud service system (since the cloud service system knows the check-in and check-out times as well as the pricing policy, the cloud service system 500 can determine the fee owed).

In some cases, a user may wish to report an unauthorized user. In these cases, the mobile device 400 may initiate the report to the cloud service system 500. The cloud service system 500 may validate the report and then release the user from the parking spot (e.g., initiate a check-out and/or waive the usage fee). The cloud service system 500 may report the unauthorized vehicle (or unusability) of a parking spot to the parking provider, who may then deal with the situation appropriately. In case a user parks in an unauthorized spot (whether by accident or otherwise), the cloud service system may warn or notify the user. A warning or notification may be issued, for example, via a mobile app or in-dash of a connected vehicle.

The smart parking system contains parking spots 610 registered by parking providers. These parking providers are independent owner operators participating in the smart parking system 600. The smart parking system 600 is able to track the availability of all parking spots 610 without the use of sensors and in real-time through information obtained from a distributed set of users (based on an aggregate of all users' reporting; e.g. check-in or check-out events). The smart parking system 600 can accurately track the availability of all parking spots within the system based on check-in and check-out requests from users without needing any information from parking providers. The number of different parking providers (and the number of suppliers of sensor technology) is vast. Thus, even if parking providers invest in sensor technology that is capable of monitoring each parking spot, they must further standardize this information such that data from a first parking lot (using a first type of sensor technology) would be consistent with data from a second parking lot (using a second type of sensor technology). The present system bypasses these needs entirely, maintaining an accurate parking database without the need for any such investments or standardization.

In order to maintain the accuracy of this information, parking spots registered for availability within the system 600 must be exclusively checked-in and out of through the system (or else the parking provider must provide some other functionality to communicate this information to the cloud service system 500 of the system 600 in order to maintain an accurate parking database). Parking providers and their parking spots are a key component of smart parking, but the spots themselves are not a part of the smart parking recommendation system, although they are registered for use within such a system.

Parking providers will be competing for customers. In addition to the previously discussed criteria that can be used to determine and recommend an ideal parking spot to the user, in some cases, the rating of the parking provider or the ratings of factors related to the parking provider may be used in the determination of a recommendation. Factors such as the accessibility of the parking lot and/or spot, security, quality of mapping and/or signage indicating the parking spot, etc. may be rated by the user(s). The recommendation system may then use this information in addition to the other criteria and/or preferences to rank the available parking spots. The rating of a user, or the aggregate rating of many or all users, may be used in determining the ranking of the available parking spots. Thus, there is incentive for parking providers to provide a parking environment that is easy to access and navigate (e.g. clear signage indicating the location of each parking spot and its assigned number) so that users rate the parking provider's lot highly.

Figure 7:
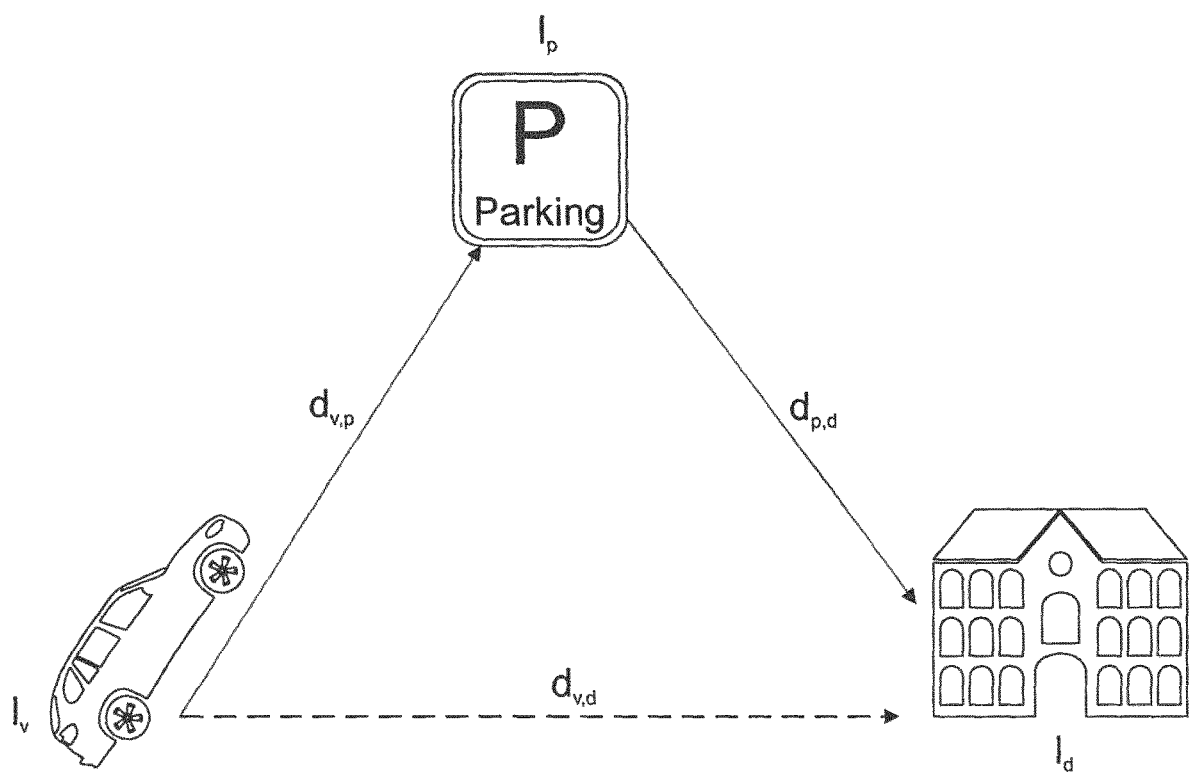
FIG. 7 is an illustration representing the relationship of variables which may be used by a scoring function to rank the available parking spots.

FIG. 7 shows an illustration representing the relationship of variables which may be used by a scoring function to rank the available parking spots. The variables discussed here represent information on a number of key features that can be used to model a scoring function to recommend a parking spot. One skilled in the art shall appreciate that a scoring function may contain other or different parameters and/or may be structured differently.

$l_v$ represents the location (e.g. a GPS or latitude/longitude coordinates) of a user's vehicle; $l_p$ represents the location of candidate parking spots; $l_d$ represents the location of the user's destination; and $d_{v,p}$, $D_{p,d}$, and $d_{v,d}$ represent the distances between them. Thus, $d_{v,p}$ represents the distance from the vehicle's location (v) to the parking spot (p), and $d_{v,d}$ represents the distance from the vehicle's location (v) to the destination (d).

In addition to those parameters illustrated in FIG. 7, a scoring function may also use other information on the parking spots, such as the parking price ($price_p$), parking type ($type_p$; such as on/off street parking, garage and its details like floor, basement, etc.), a user's rating ($r_p$), user's transaction data like cost (c), or parking duration (du). A user's rating may be the particular user's rating (as provided by the user) or an aggregate of users' ratings (e.g. 5 star as rated by the user or 4 stars as rated by all users combined).

The features of a scoring function can be: $l_v$, $l_p$, $l_d$, $l_{vp}$, $l_{pd}$, $l_{vd}$, $price_p$, $type_p$, $r_p$, c, du. A score function can be built to model the preference score between users and parking spots using the above features. The parameters of the function can be trained from past parking data (e.g. using competitive rank-based learning). The objective may be to optimize the parameters of the score function to maximize the number of pairs that rank function of positive samples is bigger than corresponding negative samples.

The system may be context-aware, waiting for the location of the user to approach the destination (e.g. $d_{v,d}$<2 km) before triggering the recommendation. Once the destination is within the threshold, the top-N candidate parking spots may be selected, as ranked by a scoring function. The scoring function may be used to model the relationship between parking lots p to the user u:

$$score(p,u)=F(l_v,l_p,l_d,d_{vp},d_{pd},d_{vd},price_p,type_p,r_p,c,du)$$

One possible way to build the F is:

$$F(l_v, l_p, l_d, d_{vp}, d_{dp}, d_{dv}, \text{price}_p, \text{type}_p, r_p, c, du) = w_{u,1} * f_l(l_v, l_p, l_d) + w_{u,2} * f_d(d_{vp}, d_{pd}, d_{vd}) + w_{u,3} * f_p(\text{price}_p) + w_{u,4} * f_t(\text{type}_p) + w_{u,5} * f_r(r_p) + w_{u,6} * f_c(c) + w_{u,7} * f_{du}(du):$$

In other words, the function F may be composed of individual functions $f_x$ multiplied by a weight factor w. Here, $w_x$ represents the weight to be accorded to each function $f_x$. The weights $w_x$ may be determined by the importance of individual features to a given user. For example, if a user does not care about price, then $w_{u,3}$ (the weight factor for $f_p$, the price function) should be very small.

For each individual function $f_x$, a proper function could be constructed depending on the feature and objective of the individual function $f_x$. For example, for $f_d, f_p$ it could be:

$$f_d(d_{vp}, d_{pd}, d_{vd}) = z_{d,1} * \log(d_{v,p}) + z_{d,2} * \log(d_{p,d}) + z_{d,3} * \log(d_{v,d})$$

$$f_p(\text{price}_p) = \frac{1}{1 + \exp(-z_{p,1} * \text{price}_p + z_{p,2})}$$

The parameters (e.g. $\Theta = \{w_{u,1} \ldots w_{u,7}, z_{d,1}, z_{d,2}, z_{d,3}, z_{p,1}, z_{p,2} \ldots \}$) in this score function could be trained. Parking spots that a user has visited could be determined from historical transactions or user profiles, leveraging this parking spot and related information to be labeled as positive samples $p_i^+$. For each $p_i^+$, all other recommended parking spots could be determined (e.g. those the user has not taken). Label those and related information as negative samples $p_i^-$.

$p_{i,j}^-$ j=1 ... $N_i$, $N_i$ is the number of recommended parking spots for the $i^{th}$ trip.

For $p_i^+$ and its corresponding $p_{i,j}^-$ (e.g. y of the $i^{th}$ trip), if score($p_i^+$, u)−score($p_{i,j}^-$,u)>0, it means that the rank function prefers $p_i^+$ over $p_{i,j}^-$, which is expected according to user behavior. If the rank function works correct for every pair in the training data, it means using the ranking function can recommend correct parking spots for the training data. The training target is to maximize the number of pairs that rank function of positive samples is greater than corresponding negative samples. In other words, if the score of a selected parking spot $p_i^+$ (and its related information) is greater than the score of those parking spots $p_{i,j}^-$ available but not chosen (at the time $p_i^+$ was chosen), it means that the rank function is correctly suggesting those spots which the user is selecting (e.g. the rank function is scoring those spots which the user ultimately chooses higher).

An optimized target function may be:

$$T(\Theta) = \sum_{i=1}^{N} \frac{\gamma_i}{N_i} \sum_{j=1}^{N_i} g\{\text{score}(p_i^+, u) - \text{score}(p_{i,j}^-, u)\} - \frac{\eta}{2} * \|\Theta\|$$

Since sin functions are non-differentiable, g is a differentiable function that approximates a sin function, for example tanh. $N_i$ represents the number of negative samples $p_{i,j}^-$ for each $p_i^+$ (e.g. for the $i^{th}$ trip). θ represents all parameters for a personalized profile. n/2*∥θ∥ is the L2 regularization to prevent overfitting. $\gamma_i$ represents the weight for each positive event $p_i^+$. It may be set to 1 if all positive examples have similar weights. If a user has provided ratings (e.g. rating the parking spot location, the parking provider, etc.) then these ratings may be used to balance the weights $\gamma_i$ accordingly. For example, if a user rated a first parking event as 5-stars but a second parking event as 1-star, $\gamma_1$ may be some ratio of 5:1 to $\gamma_2$.

$$\Theta^* = \max_\Theta T(\Theta)$$

$$\Theta^{new} = \Theta^{old} - \tau^k * \frac{\partial T(\Theta^{old})}{\partial \Theta}$$

T(θ) is differentiable. Gradient descent can be used to get the parameters of the user profile. For parking recommendations, the user's preferred parking type, distance, and price preferences, and the weights for them, can be jointly learned through the target gradient descent optimization of T(θ). The obtained parameters θ may then be used to determine candidate parking spots which have a high or maximum score using the previously defined scoring function. These candidate parking spots may then be ranked based on their scores.

As new training data is obtained, the model can be adapted to it. Since most parking spots behave similarly to those coming from the same parking service provider (e.g. price, location, type, etc.), optimization is needed for diversification coverage.

Users may be inundated by the number of available candidate parking spots. The recommendation (e.g. the information on available parking spots and/or the ranking of such spots) may take into account user behavior (e.g. via machine learning), the user's location and/or parking spot location (e.g. via the context engine), and/or vacant parking spots into account.

By using a model that charges the user only for the time the user is actually using the space, trust and quality of service are enhanced. The service may begin to charge the user when the user confirms the parking recommendation (e.g a check-in successfully occurs), and stops charging the user when the user leaves the parking spot (e.g. a check-out successfully occurs). Users can choose how early to check-in (e.g. by controlling the threshold which controls the delay of information on available parking spots) and can check-out automatically as they drive away from the parking spot, minimizing any excess time used. Users can reduce the time searching for parking and can get the specific exact right parking spot depending on the desired budget and other preferences. Charging can be stopped right after the user leaves the parking lot in real time, rather than basing parking fees on predefined durations which often lead to users overpaying. Payments may be processed in real time (and/or automated) as users leave the parking spot.

Parking providers can improve the usage efficiency of parking spots and optimize profits by using better pricing modeling since the market desires can be dynamically seen (e.g. real-time supply and demand data is known). Dynamic pricing policies can optimize the price using holistic data analytics. Several pricing models are possible, such as fixed rate (e.g. for a given period such as an hour or a day), or dynamic pricing (e.g. high pricing for high demand and less vacancy) or other strategy to operate. The parking provider can edit the pricing policy and adjust it according to the parking providers business objectives (e.g. at the objective of profit maximization). For example, a parking provider may choose to run a pricing policy with an objective to bring in customers for a short time (e.g. by operating at a loss or substantial discount) in order to run a promotion.

Figure 8:
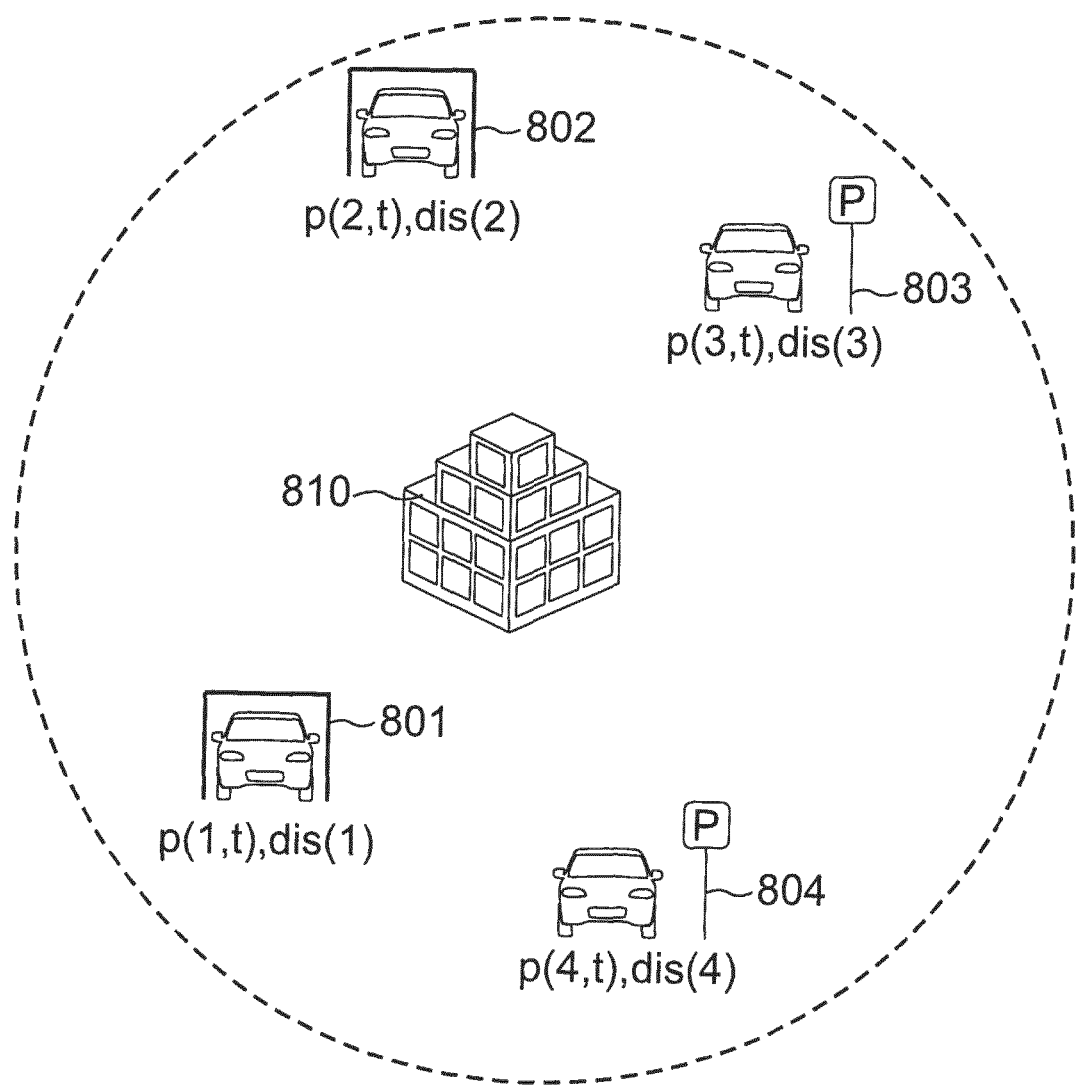
FIG. 8 is an illustration representing the relationship of variables which may be used to implement a dynamic pricing model.

FIG. 8 shows an illustration representing the relationship of variables which may be used to implement a dynamic pricing model based on a real-time supply and demand of parking spots. This is an improvement over existing pricing policies, which rely on fragmented data (e.g. data supplied to them by parking providers which may be inconsistent in form and/or time) or which rely on more general information (e.g. that x of y available parking spots are in use, but not which parking spots are in demand; only the entire lot may be assessed). Since all vehicles are connected and the platform knows the real-time supply and demand of parking resources, a dynamic pricing model can be applied to adjust the parking prices in real-time.

In this model, at time t, garage i has s(i,t) vacant parking spots. The demand for a parking spot at a garage i is represented as d(i,t). The price p(i,t) at t for garage i may be determined by the vacant parking spots s(i,t) and demand trends d(i,t) at time t, which can be represented as follows:

$$p(i, t) = f\left(\frac{d(d(i, t))}{dt}, d(i, t), s(i, t)\right)$$

The number of vacant parking spots s(i,t) (e.g. parking spots which are available) at a garage i at a time t can be known from the parking database. The demand d(i,t) for parking at a garage i at a time t can be known based on the number of requests for parking being received at time t. However, the rate of change of the demand (d(d(i,t))/dt) at a given time t may not always be known (e.g. when t is the present). A simple method is to use d(i,t−1) to represent d(i,t). The price p(i,t) may then be calculated as follows:

$$p(i, t) = f\left(\frac{d(d(i, t-1))}{dt}, d(i, t), s(i, t)\right)$$

In reality, the price should be in a range [p_low(i), p_high(i)]. A logistic regression function is used as a reference implementation.

$$p(i, t) = p\_low(i) + (p\_high(i) - p\_low(i)) * e^{-\left(\alpha * \frac{dd(i,t-1)}{dt} + \beta * s(i,t) + \gamma d(i,t) + \delta\right)}$$

All parameters can be trained to optimize the profit (or desired criteria) as well as human intervention.

Given a destination of a user, the system can search all parking spots within an area (e.g. within a threshold around the destination). With different parking prices and distances to the destination, the system can recommend parking spots in accordance with more desired criteria that are more suitable to the user. For example, if the user is going to a meeting and running late, the system may recommend a parking spot that is closer to the destination but which might cost more. In other cases, where the user parks in the same spot on a regular basis (e.g. when going to work every day) the system can learn from this behavior and recommend the same spot on future mornings when the user is headed to work (e.g. based on context of the user's destination and/or travel time). The system can learn the user's preference; if the user usually likes to park the car at inexpensive spots but at a farther distance from the destination, the system can use this user preference and context information to recommend more appropriate spots in the future.

As illustrated in FIG. 8, four different parking garages 801, 802, 803, 804 with vacant spots are shown p(1,t), p(2,t), p(3,t), p(4,t). Each parking garage p(1,t), p(2,t), p(3,t), p(4,t) has a distance dis(1), dis(2), dis(3), dis(4) to the user's destination 810. In the example shown in FIG. 8, lot #1 is close to the destination 810 (e.g. dis(1) is small) and also provides covered parking. In this example, it may be likely that lot #1 is expensive to park in. Lot #2 also provides covered parking but is much further away from the destination 810 (e.g. dis(2) is greater than dis(1)). Lots #3 and #4 do not provide covered parking, while lot #3 is closer to the destination 810 and lot #4 is further away. In the example shown in FIG. 8, the user may have previously indicated (or the system had learned from previous behavior) that the user did not care for covered parking, but the user cared greatly for a short distance to the destination. Based on this information, the system may disregard the fact that lots #1 and #2 have covered parking (e.g. the weights according to these factors in the score function would be very low or zero). However, the weights accorded to the dis(x) would be very high, since the user has indicated a strong preference for a parking spot near the destination. Thus, in this simplified example, the system may rank the four parking lots according to smallest dis(x) and parking lot #1 may be recommended despite costing more. A different user may have expressed a preference for a more balanced suggestion of price to distance. For this other user, the system may weigh these factors differently and may suggest parking lot #3 instead (e.g. parking lot #3 is slightly further away from the destination 810 than parking lot #1, but since parking lot #3 is not covered it is presumably cheaper than parking lot #1).

Using the proposed method, drivers can dynamically reserve a parking spot and reach the parking spot directly without searching. This will result in a dramatic reduction in traffic and driving time, in turn reducing power consumption, air pollution, and increasing safety. A user can receive personal and context-aware parking services; for example, a user can say "recommend parking" and the system can detect the user's location, preferences, and obtain a list of nearby parking spots that best match this criteria. Once the user leaves the parking spot, the system can automatically detect this change and complete the parking service, including payment processing automatically without any additional input by the user.

Parking service providers may provide such a service to their consumers with little or no investment (e.g. no hardware or infrastructure costs). This can significantly improve business operations, allowing providers to maximize facility usage efficiency, optimize profits with pricing policies based on global dynamic parking availability and transactional data. Staggered adoption may be enabled, as it is unnecessary to have all or many service providers ready to adopt this solution together. Instead, parking providers can adopt the solution whenever they are ready.

As more parking providers participate, the system will have an increasing amount of holistic data on parking demand availability, and it can optimize parking facilities as well as enabling dynamic pricing policies. Using car driving data and parking service transactions to provide a richer and more complete data-set to better understand and model parking information and pricing. Through data analytics, insights into parking availability, cost, traffic, routing difficulty, and suggestions for parking facility planning may be obtained.

One example may be generalized as follows: A user begins driving from a first destination (e.g. home) to a second destination with a connected vehicle. The user's destination is obtained through a navigation input from the user or learned from previous behavior. For autonomous vehicles, the destination is a necessity for the system to navigate and plan routes, and can thus be reliably known.

While the driver is approaching the destination as detected by location tracking and processed in a context engine, the system is able to identify the parking intent learned form the user's historic behavior via machine learning. If parking is needed, a smart parking service can recommend to the user parking spots. The user can be navigated to the entrance of parking lots or to the location of the parking spots, provided detailed parking spot info, pricing info, and a distance to the final destination. Upon receiving the user's confirmation, the selected parking spot is reserved for the user and payment starts through a pricing policy management. The user drives to the parking spot following the provided information.

When the user drives away from the parking spot, the system is able to detect the event from location tracking. Charging for the parking spot ends, completing the smart parking service. The parking spot is then available to offer for others.

The entire process is:
Recommend right before approaching destination;
→Select and confirm;
→Stop charging fee for parking usage right after leaving
A user cannot park or pay unless they use the system, ensuring a closed loop and ecosystem.

Overall, the smart parking system contains at least the following:
Personalized system: the system makes personalized recommendations on a parking spot based on the available parking resources and known user preferences;
Context-aware system: the personal recommendation is only sent to the user at the right moment (e.g. based on the context of the user's actions, such as a distance to destination); and
Autonomous system: the check-in, check-out, pricing, and fraud detection can all be managed automatically based on the objective to be optimized. Users can confirm to highlight user centric design while businessmen are allowed to intervene with the settings to respect their business strategies.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for smart parking a connected vehicle, the method comprising:
  determining, by a mobile device of a user, a destination of the user's vehicle based on a historic travel data of the user retrieved from a memory storing a parking profile of the user;
  determining that a distance from a current location of the mobile device to the destination is less than a predefined threshold, and in response
    transmitting the destination and user preferences related to a desired parking spot to a cloud service system;
  receiving information on available parking spots in a predefined area near the destination of the user's vehicle from a parking database stored in the cloud service system;
  receiving an input via an interface of the mobile device of the user to reserve the desired parking spot among the available parking spots; and
  initiating an online check-in of the reserved parking spot by transmitting a check-in request from the mobile device of the user to the cloud service system to assign the reserved parking spot to the user in the parking database, wherein
    the information on available parking spots includes dynamic pricing for an available parking spot based on a quantity of check-in requests received from one or more other mobile devices for the available parking spot.

2. The method of claim 1, further comprising:
  detecting a change in movement of the user's vehicle, wherein
    a termination of parking is determined if the change in movement is greater than a predefined threshold; and
    initiating an online check-out of the reserved parking spot if the termination of parking is determined.

3. The method of claim 1, further comprising:
  detecting a current location of the user's vehicle;
  determining a distance from the current location to the destination of the user's vehicle; and
  delaying reception of the information on available parking spots if the distance from the current location to the destination of the user's vehicle is greater than a predefined threshold.

4. The method of claim 3, wherein
  the user of the mobile device configures the predefined threshold to determine how early to check-in.

5. The method of claim 3, wherein the delaying reception of the information on available parking spots comprises:
  requesting the information on available parking spots be sent at a future time when the user is within the predefined threshold of the destination of the user's vehicle.

6. The method of claim 1, wherein
  the information on the available parking spots are ranked according to a scoring function weighted according to one or more interests of the user.

7. The method of claim 1, wherein
  a supply and a demand of the available parking spots is determined in real-time.

8. The method of claim 1, further comprising:
  reporting a second user if the reserved parking spot is in-use by the second user.

9. The method of claim 8, further comprising:
  initiating an online check-out of the reserved parking spot; and
  initiating an online removal of the parking spot in use by the second user from the available parking spots in the parking database.

10. The method of claim 1, further comprising:
  fining the user if the user parks in a parking spot that was not reserved for the user.

11. The method of claim 1, wherein
  the online check-in further comprises transmitting payment information from the mobile device to the cloud service system.

12. A mobile device for smart parking, the mobile device comprising:
  a destination processor configured to determine a destination of a user of the mobile device based on historic travel data of the user retrieved from a memory storing a parking profile of the user and to transmit the destination of the user of the mobile device to a parking processor;
  a transceiver configured to:
    transmit the destination and user preferences related to a desired parking spot to a cloud service system in response to a determination that a distance from a current location of the mobile device to the destination is less than a predefined threshold;
    receive information on available parking spots in a predefined area near the destination of the user of the mobile device from the parking processor based on a parking database, wherein
    an interface of the mobile device is further configured to receive an input to reserve the desired parking spot among the available parking spots; and
  a check-in processor configured to initiate an online check-in of the reserved parking spot by transmitting a check-in request to the cloud service system to assign the reserved parking spot to the user in the parking database, wherein
    the information on available parking spots includes dynamic pricing for an available parking spot based on a quantity of check-in requests received from one or more other mobile devices for the available parking spot.

13. The mobile device of claim 12, further comprising:
  sensor circuitry configured to detect a change in movement of the mobile device, wherein
    a termination of parking is determined if the change in movement is greater than a predefined threshold; and
  a check out processor configured to initiate an online check-out of the reserved parking spot if the termination of parking is determined.

14. The mobile device of claim 12, further comprising:
  a location detector configured to detect a current location of the mobile device, wherein
    the destination processor is further configured to:
      determine a distance from the current location to the destination of the user of the mobile device, and
      delay reception of information on the available parking spots if the distance to the destination of the user of the mobile device is greater than a predefined threshold.

15. The mobile device of claim 14, wherein
the destination processor delays the reception of information based on the predefined threshold set by the user of the mobile device.

16. The mobile device of claim 12, further comprising:
a ranking processor configured to rank the information on the available parking spots according to a scoring function weighted according to one or more interests of the user.

17. A cloud service system for smart parking, the cloud service system comprising:
a parking processor; and
a parking database, wherein the parking processor is configured to:
receive a user's destination in response to a determination that a distance from a current location of a mobile device to the destination is less than a predefined threshold, and in response
receiving user preferences related to a desired parking spot to a cloud service system;
return information on available parking spots in a predefined area near the user's destination based on the parking database;
update the parking database to check-in to a desired parking spot by assigning the desired parking spot to the user in the parking database upon receiving a check-in request transmitted from the mobile device to reserve the desired parking spot among the available parking spots, wherein
the information on available parking spots includes dynamic pricing for an available parking spot based on a quantity of check-in requests received from one or more other mobile devices for the available parking spot, and
receive a picture from the mobile device of a license plate of an unauthorized vehicle occupying the desired parking spot;
validate the picture;
release the user from the desired parking spot after validating the picture by initiating an online check-out of the user from the desired parking spot; and
after releasing the user from the desired parking spot, updating the parking database to reflect that the desired parking spot is unavailable.

18. The cloud service system of claim 17, wherein
the parking processor is further configured to:
update the parking database to check-out of the reserved parking spot upon notice of termination of parking.

19. A system for smart parking, comprising:
a mobile device, comprising:
a destination processor configured to:
determine a destination of a user of the mobile device based on historic travel data of the user retrieved from a memory storing a parking profile of the user; and
transmit the destination and user preferences related to a desired parking spot of the user of the mobile device to a cloud service system in response to a determination that a distance from a current location of the mobile device to the destination is less than a predefined threshold;
a receiver configured to receive information on available parking spots in a predefined area near the destination of the user of the mobile device from the cloud service system, wherein
an interface of the mobile device is further configured to receive an input from the user to reserve the desired parking spot among the available parking spots; and
a check-in processor configured to initiate an online check-in of the reserved parking spot by transmitting a check-in request from the mobile device; and
a cloud service system, comprising:
a parking processor; and
a parking database, wherein the parking processor is configured to receive the destination of the user of the mobile device from the mobile device;
return information on the available parking spots in a predefined area near the destination of the user of the mobile device based on the parking database; and
update the parking database to check-in to the reserved parking spot upon receiving the check-in request to reserve the desired parking spot among the available parking spots by assigning the reserved parking spot to the user in the parking database, wherein
the information on available parking spots includes dynamic pricing for an available parking spot based on a quantity of check-in requests received from one or more other mobile devices for the available parking spot.

20. A computer program product comprising a non-transitory computer readable medium having computer readable program code embodied therein, wherein the computer readable program code, when being loaded on a computer, a processor, or a programmable hardware component, is configured to implement a method for smart parking a connected vehicle, the method comprising:
determining a destination of a user's vehicle based on historic travel data of the user retrieved from a memory storing a parking profile of the user;
determining that a distance from a current location of a mobile device to the destination is less than a predefined threshold, and in response
transmitting the destination and user preferences related to a desired parking spot to a cloud service system;
receiving information on available parking spots in a predefined area near the destination of the user's vehicle from a parking database stored in the cloud service system;
receiving an input via an interface of the mobile device of the user to reserve the desired parking spot among the available parking spots; and
initiating an online check-in of the reserved parking spot by transmitting a check-in request from the mobile device of the user to the cloud service system to assign the reserved parking spot to the user in the parking database, wherein
the information on available parking spots includes dynamic pricing for an available parking spot based on a quantity of check-in requests received from one or more other mobile devices for the available parking spot.

* * * * *